United States Patent [19]

Ashbey

[11] Patent Number: 5,361,106
[45] Date of Patent: Nov. 1, 1994

[54] CINEMATOGRAPHIC OPTICAL SYSTEM

[75] Inventor: James A. Ashbey, London, United Kingdom

[73] Assignee: Delta System Designs Limited, London, United Kingdom

[21] Appl. No.: 838,274
[22] PCT Filed: Jul. 6, 1990
[86] PCT No.: PCT/GB90/01045
§ 371 Date: Mar. 13, 1992
§ 102(e) Date: Mar. 13, 1992
[87] PCT Pub. No.: WO91/01018
PCT Pub. Date: Jan. 24, 1991

[30] Foreign Application Priority Data

Jul. 6, 1989 [GB] United Kingdom ............ 89 15468.6

[51] Int. Cl.⁵ .................. G03B 35/00; G03B 35/08
[52] U.S. Cl. ............................. 352/57; 352/60; 352/133
[58] Field of Search ............ 352/57, 60, 62, 65, 352/86, 133, 135

[56] References Cited

U.S. PATENT DOCUMENTS

| | | | |
|---|---|---|---|
| 1,477,541 | 12/1923 | Clement et al. | 352/62 |
| 1,558,483 | 10/1925 | Kelley | 352/45 |
| 2,729,138 | 1/1956 | Bernier | 352/60 |
| 3,712,199 | 1/1973 | Songer, Jr. | 352/60 |
| 4,934,824 | 6/1990 | Ling | 352/57 |
| 4,963,015 | 10/1990 | Ling | 352/57 |
| 4,993,828 | 2/1991 | Shaw et al. | 352/59 |

FOREIGN PATENT DOCUMENTS

| | | | |
|---|---|---|---|
| 2206702 | 1/1989 | United Kingdom . | |
| 9216874 | 10/1992 | WIPO | 352/57 |

Primary Examiner—Michael L. Gellner
Assistant Examiner—Eddie C. Lee
Attorney, Agent, or Firm—Millen, White, Zelano & Branigan

[57] ABSTRACT

A method and apparatus for providing high definition cinema pictures involves the use of a plurality of filters, each capable of transmitting light in a different wavelength band, to form a plurality of superimposed image components on the cinema film during a single frame period. A similar filtering operation is carried out when the film is projected to reconstitute the original colour image. Thus, if two filers are used at each stage twice the normal frame rate can be achieved whilst still using a camera and projector operating at the normal rate.

9 Claims, 8 Drawing Sheets

NORMAL 70mm FILM FRAME

35mm    35mm

CLOSURE (1) EXPOSURE   CLOSURE (2) EXPOSURE   CLOSURE (1) EXPOSURE

CINEMATOGRAPHIC OPTICAL SYSTEM

The present invention relates to a high definition system for the cinema.

In a first aspect the invention provides a method and a camera for recording image frames on an image-recording medium, successive frames being displayed, in use, at a predetermined frame rate defining a predetermined frame period, the camera being characterized in that it is provided with filter means having a plurality of filter planes each capable of transmitting light in a different wavelength band, the filter planes of the filter means being interposed sequentially between an object, the image of which is to be recorded, and the image-recording medium so that the complete sequence of filter planes is repeated once in each frame period.

In a further aspect the invention provides a cinematographic film having a plurality of image frames formed thereon, the film being displayed, in use, so that successive image frames are displayed at a predetermined frame rate defining a predetermined frame period; each image frame comprising a plurality of image components superimposed on one another, the plurality of image components having been formed by successive exposures to light in different wavelength bands during a single frame period.

In a further aspect the invention provides a method and means for displaying image frames recorded by the method outlined above, the means being characterized in that a light signal derived from the recorded image frames is subjected to a filtering operation in which the said signal is passed through filter means having filter elements each capable of transmitting a light signal representing a different wavelength band, the light signal being passed through the filter elements sequentially so that the complete sequence of filter elements is repeated once in each frame period.

Thus the system of the invention can effectively double the exposure rate of standard cine-photography, from 24 Hz to 48 Hz, without doubling the speed of the original recording camera or doubling the speed of the final on-screen projector.

Basically, the system is a colour subtraction (filtering), colour inversion and colour recomposition system, involving the precise, synchronised interposition of filters.

The system will be described in detail below, by way of example, in its recording (encoding) and projection (decoding) modes with reference to the drawings, in which.

Figure 4:
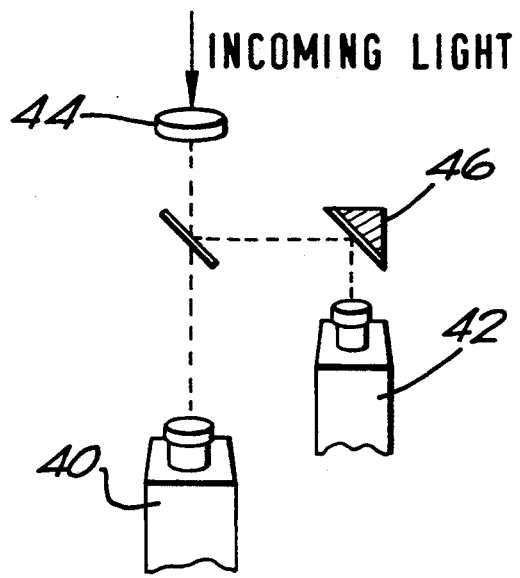
FIG. 4 illustrates the use of two cine cameras each provided with a colour filter as shown in FIG. 2.
Figure 5:
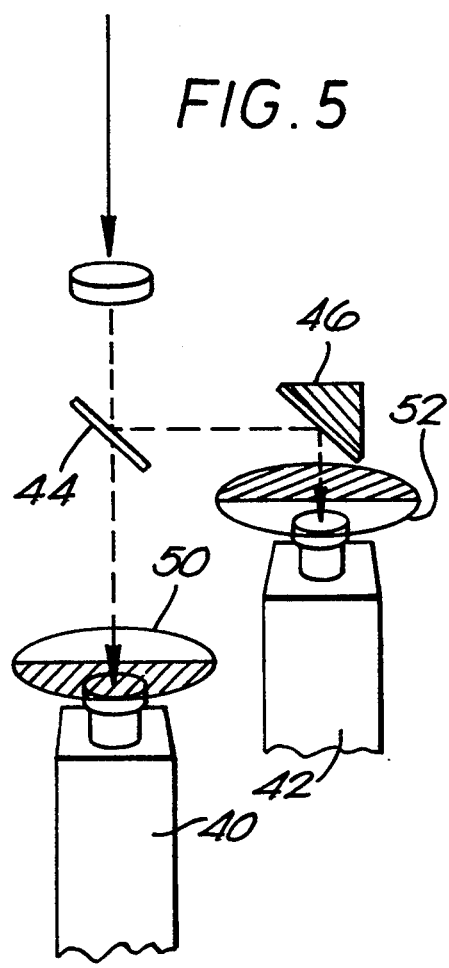
FIG. 5 shows the arrangement of FIG. 4 in greater detail.
Figure 6A:
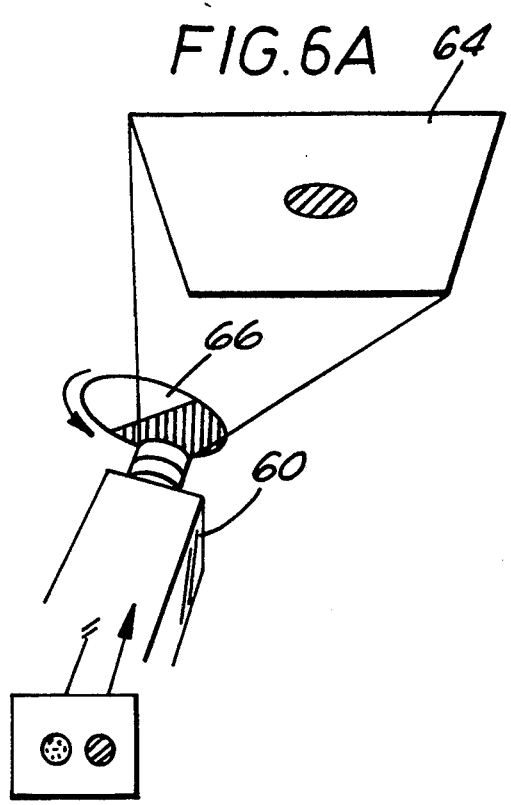
Figure 6C:
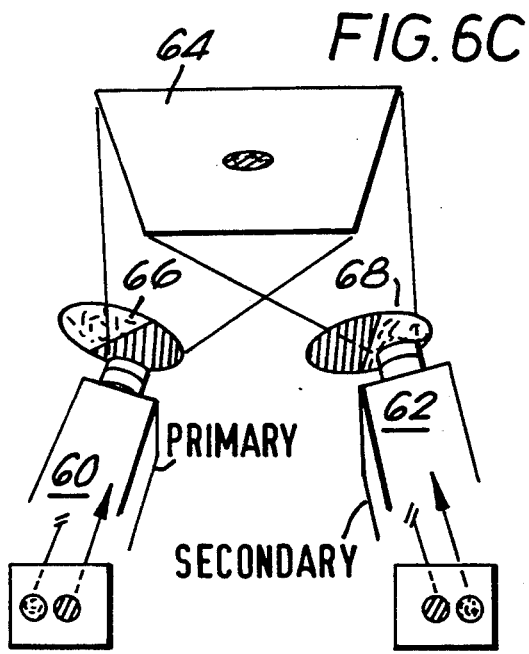
Figure 6B:
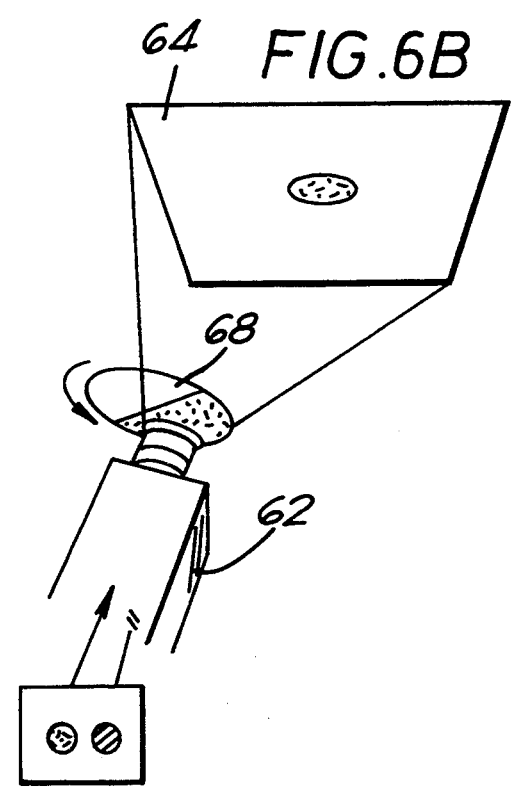
Figure 6D:
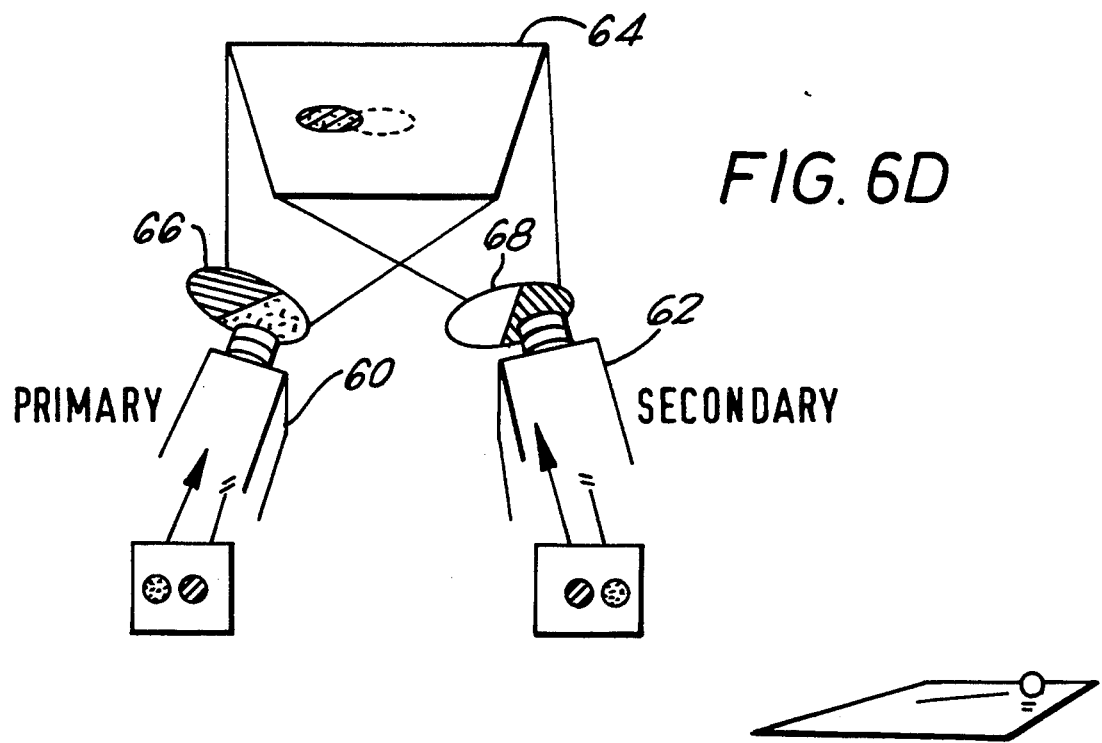
Figure 7:
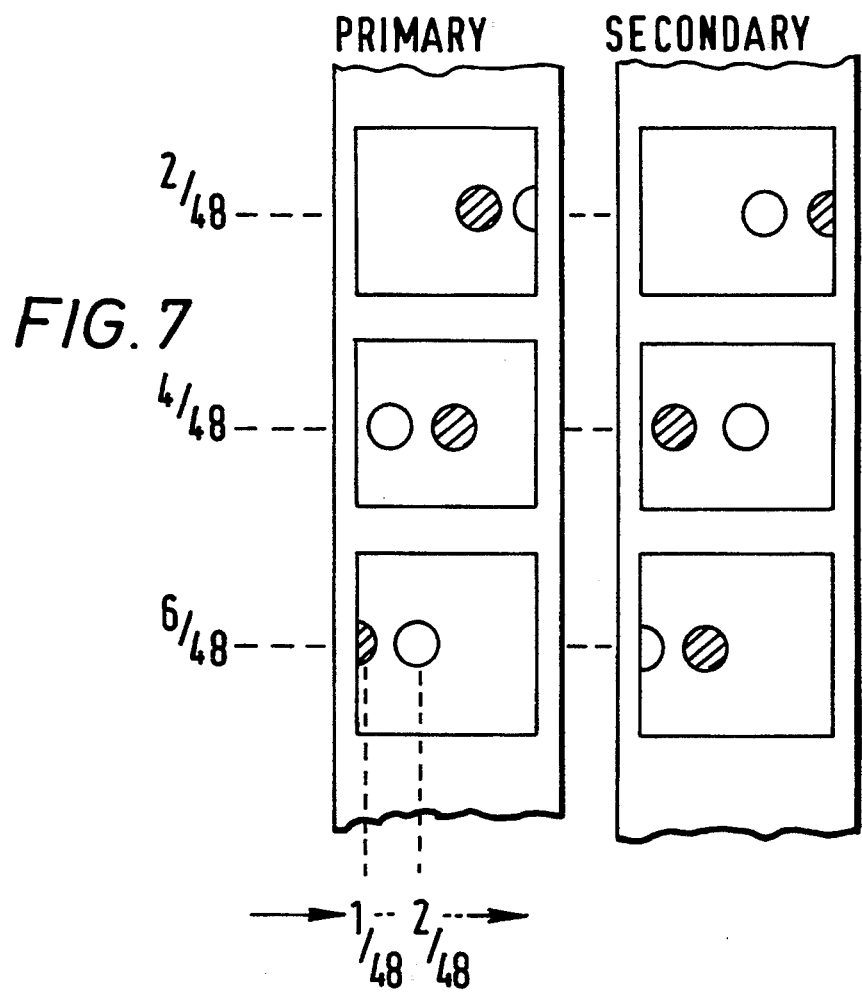
Figure 8:
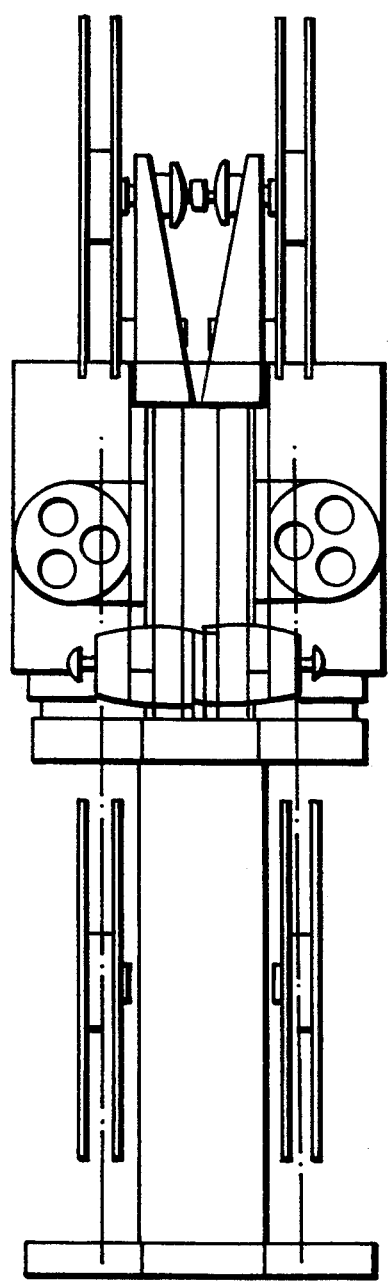
Figure 9:
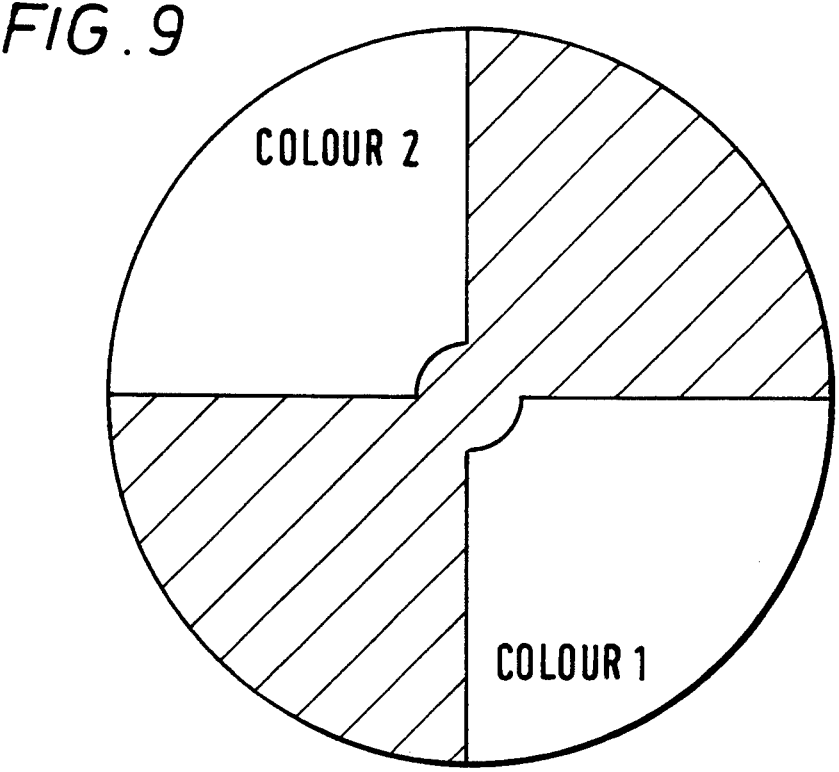
Figure 10:
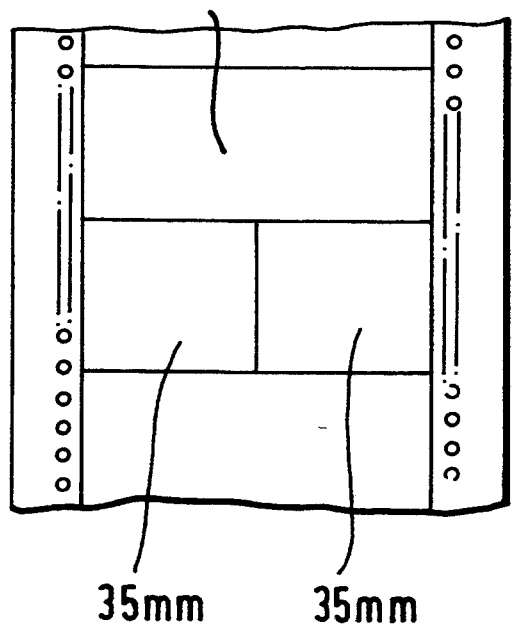
Figure 11:
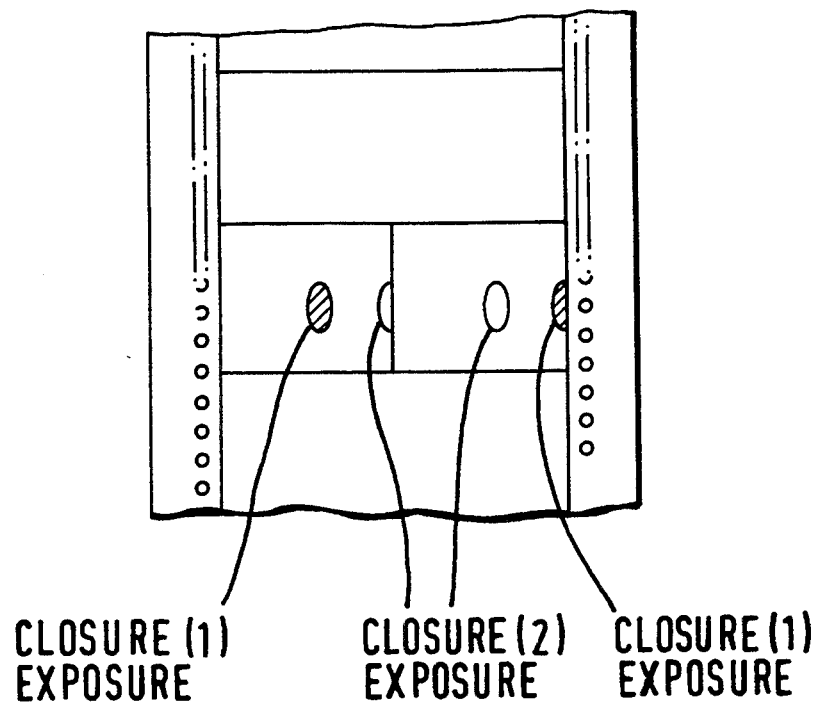
Figure 12:
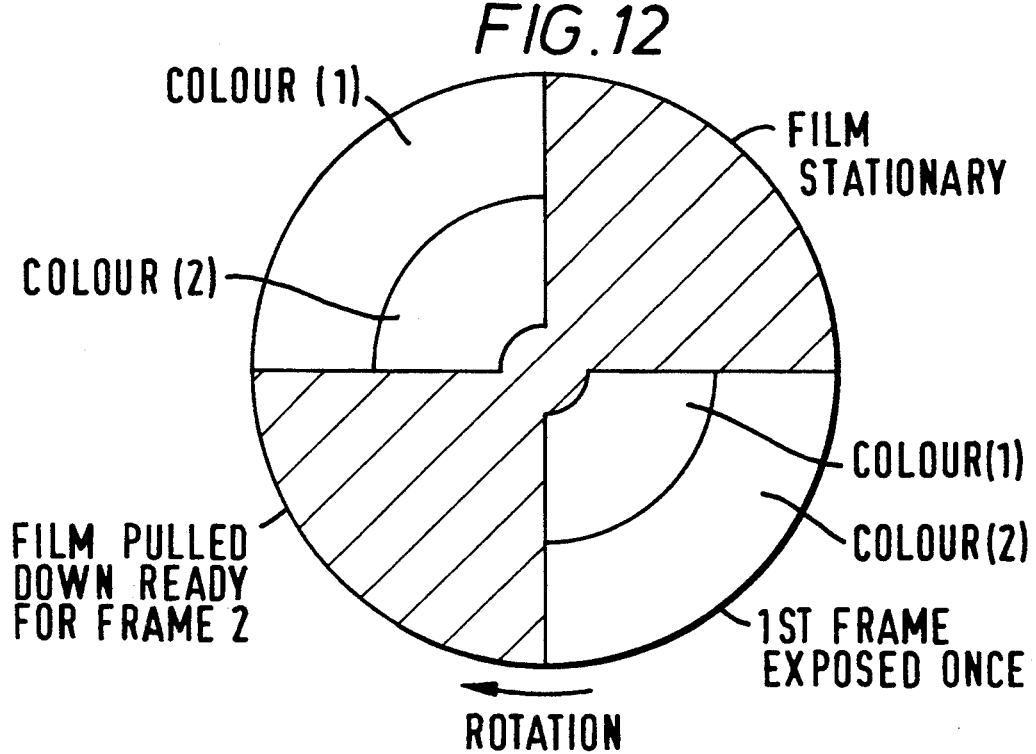
Figure 13:
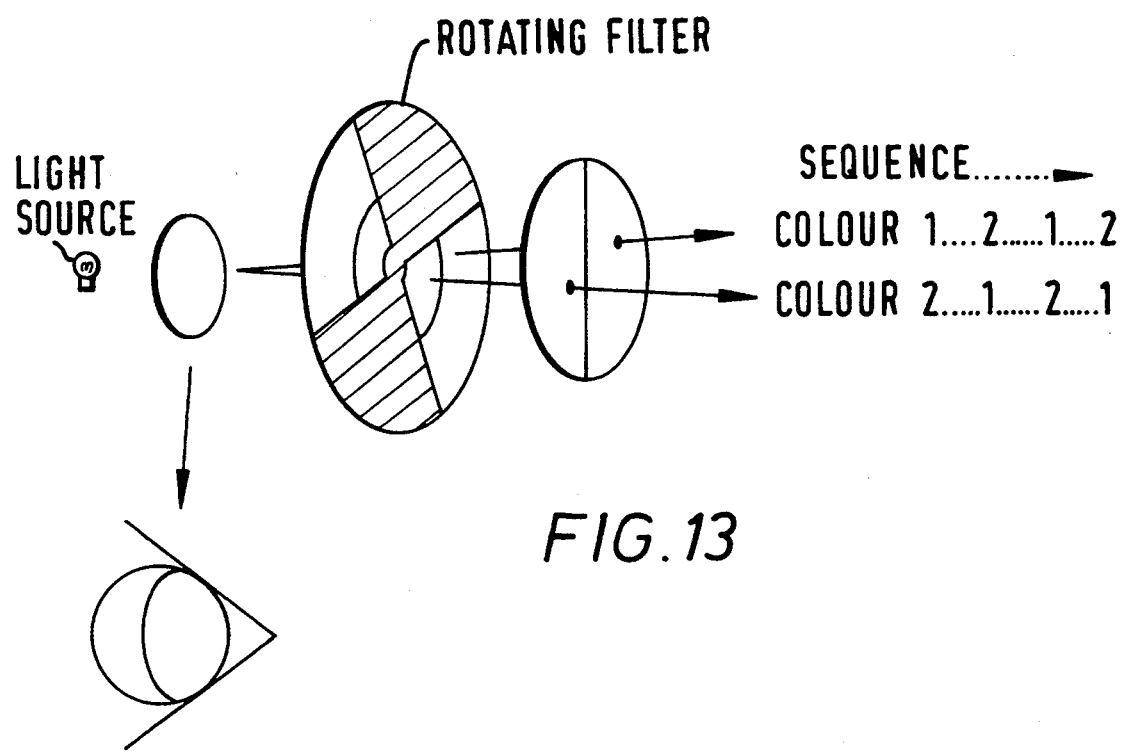

FIGS. 6A to D show an arrangement for projecting film negatives obtained using the camera arrangement of FIGS. 4 and 5;

FIG. 7 shows diagrammatically the projection scheme of the arrangement of FIGS. 6A to D;

FIG. 8 shows an alternative projection arrangement using a single projector assembly;

FIG. 9 shows a rotary filter for use in the apparatus of FIG. 8;

FIG. 10 shows schematically the arrangement of exposures on a 70 mm film strip;

FIG. 11 shows the arrangement of FIG. 10 in greater detail;

FIG. 12 shows a combined shutter and colour filters for use in the apparatus of FIG. 8;

FIG. 13 shows the shutter/colour filter of FIG. 12 in use; and

Figure 14:
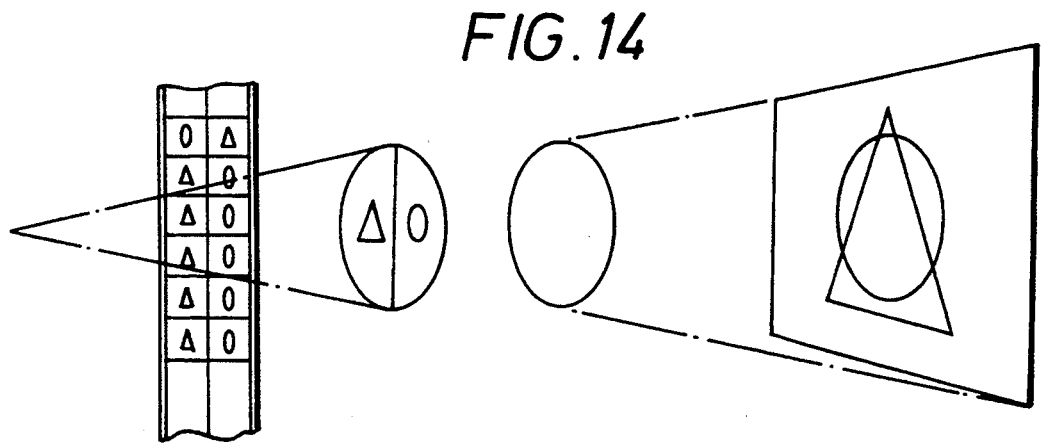

FIG. 14 shows projection of the dual images on the film strip of FIG. 10 onto a single screen.

Figure 1:
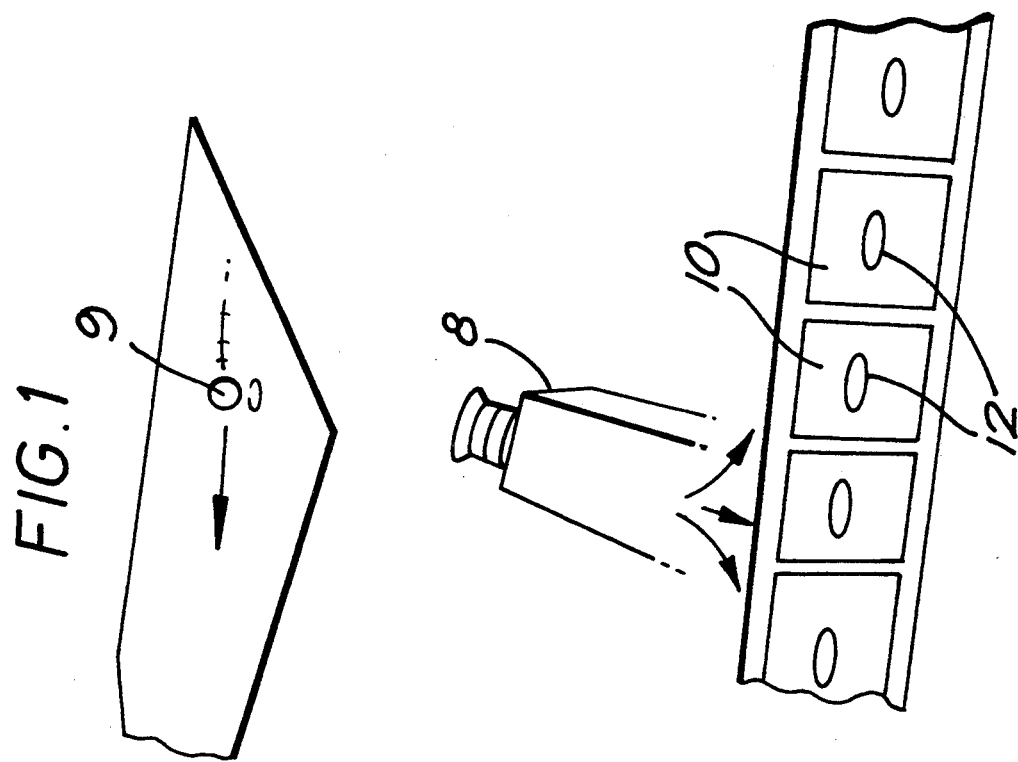
FIG. 1 shows schematically the image of a fast moving object formed on a cine film.

A conventional cine (recording) camera 8, working at a frame rate per sec (f.p.s.) of 24 Hz, will as shown in FIG. 1, 'catch' a fast moving object 9, twenty four times a second on consecutive frames 10, as a series of elongated blurs 12.

Figure 3:
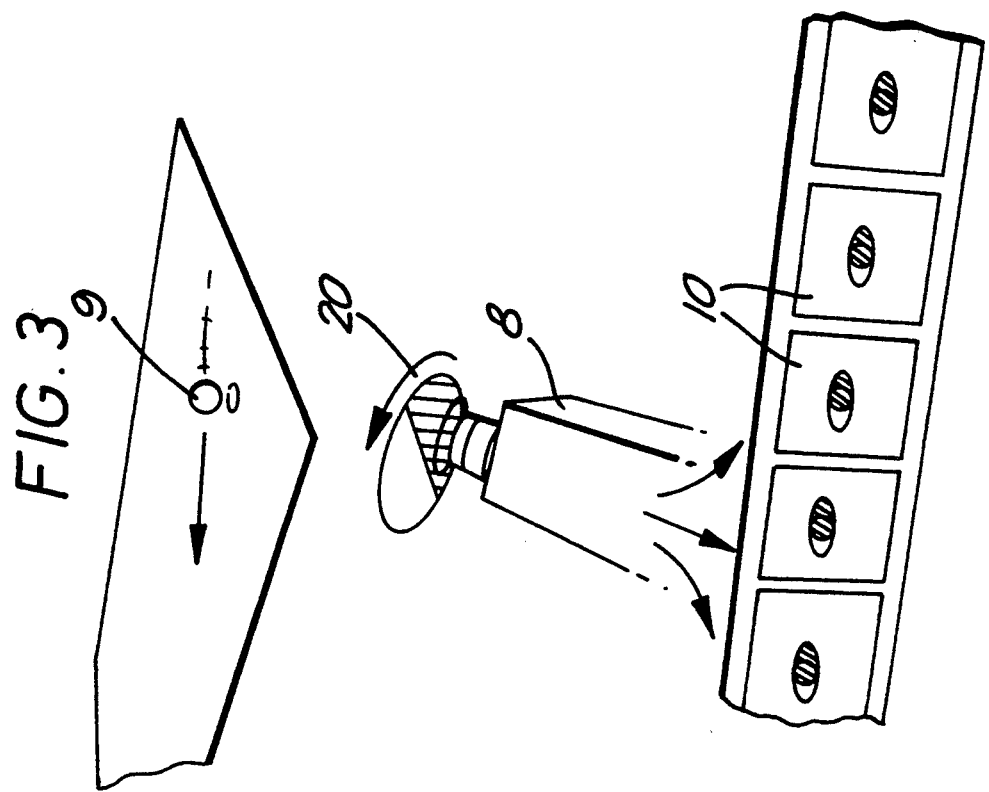
FIG. 3 is analogous to FIG. 1 and shows schematically the images formed when the filter of FIG. 2 is positioned between the object and the camera.

A two plane colour rotating filter 20 is introduced in front of the cine camera 8 as shown in Figure (with each colour plane 22,24 of the filter 20 being a 180-degree arc), with a rotation frequency of 24 Hz synchronized to camera shutter action; then each colour plane 22,24 of the filter 20 totally occludes the camera lens for 1/48th of a second. As a result each blurred image of the fast moving object 9 caught on each frame 10 is now in two distinct colour halves, as shown in FIG. 3.

Figure 2:
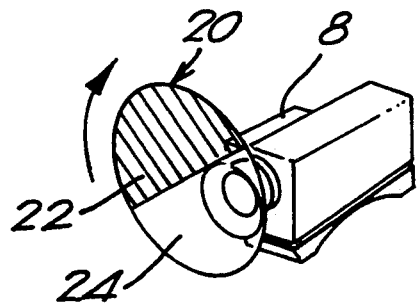
FIG. 2 shows a two-colour filter positioned in front of a cine camera lens.
Figure 2A:
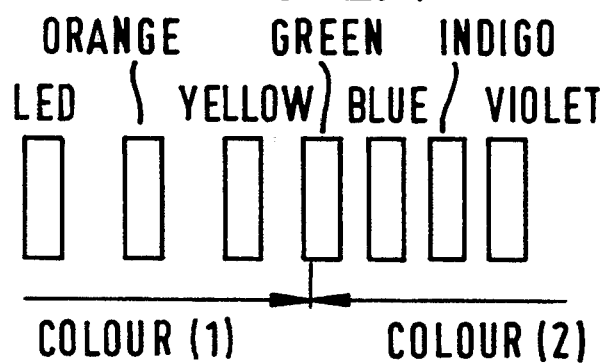
FIG. 2a illustrates schematically the transmission spectra of the colour planes of the filter of FIG. 2.

The two colours of the rotating filter 20 are opposite halves of the visible spectrum. Colour (1) is red to mid point and colour (2) is blue to mid point. Between them colour (1) and colour (2) cover the entire visible spectrum as illustrated in FIG. 2a. The result of the interposition of the rotating filter 20 is to effectively produce two different colour "snapshots" (colour (1) followed by (colour 2)) of the original image, for each frame 10'. There will therefore be 48 pictures of the object 9 every second, 24 in each colour.

In a sense, each frame is double exposed, once in colour (1) and then once in colour (2), but the 'double' exposure occurs within the time interval of a single exposure; also, of course, the camera shutter has opened only once.

In a preferred system, two cameras 40,42 are involved in the recording, arranged as shown in FIG. 4. A beamsplitter (half-silvered mirror) 44 and prism 46 are employed to reflect 50% of the incoming light from the object 9 into the lens of each camera 40 and 42. Both cameras 40 and 42 then operate as described above, but with one difference, the rotating filters (not shown) are 180 degrees (or one colour-plane) out of phase. Consequently, when colour (1) occludes the lens of the primary camera 40 (see FIG. 5), colour (2) is in a similar position covering the lens of the secondary camera 42 (see FIG. 5). The primary and secondary cameras 40 and 42 are functionally identical and both have the same focal length from the object or main lens stop. The two cameras 40 and 42 are arranged so that they receive identical images.

Both cameras 40 and 42 are in film and shutter synchronisation, so too are the revolving filters 50,52 but, as mentioned above, the latter 180 degrees (or a colour plane) out of phase.

This arrangement then produces two negatives, a primary negative (from camera 40) and a secondary negative (from camera 42). These result in primary and secondary prints, which are used to generate a full colour image, as will be described below.

The greatest level complexity involved in the system of the invention is in the projection apparatus, but here also the main components are off-the-shelf, and may remain unmodified. The system calls for the integration of already manufactured mechanical components.

Two sync-locked projectors are required, and into one of these is loaded the primary print, and into the other projector, the secondary print. These are referred to as the primary projector and secondary projector, respectively. Both projectors must be further modified, by the addition of two rotating filters, similar to the encoding filter, each synchronised to their host projector and therefore to each other. Alternatively, the modification may involve replacing the shutter flicker-gate of each projector with a filter mechanism, which fully occludes the projector beam twice during a frame interval, once with either colour.

A projector system utilising rotary filters is illustrated in FIGS. 6A-D. As shown most clearly in FIGS. 6C and 6D primary and secondary projectors 60 and 62 are focused onto a single display screen 64. Each projector 60 and 62 is effectively projecting the subtracted (inverse) colour component image of the colour component image projected by the other; subtracted by the optical property of the encoding filters 50 or 52. However, the interposition of projector filters 66 and 68 has a very important effect, and is the key to the decoding and the recreation on screen, of the original object colour.

During original encoding, either colour (1) or colour (2) was always the first colour to be exposed on each new frame of either primary camera 40 or secondary camera 42. In the following example we will consider the case of primary camera 40 and colour (1). As a result, during projection, the correct flow of action must involve the display of the colour (1) image on the print first.

For the projector with the primary print, the primary projector 60, the projector filter 66 must therefore always have the colour (1) plane occluding the projector beam during the first cycle (1/48th sec), this will result in the colour (1) image being projected first and the colour (2) image being barred from the screen during the first 1/48th of a second of each new frame.

For the projector with the secondary print, the secondary projector 62, the position is that during the corresponding time interval, as just described (the first 1/48th of a second of each new frame), the colour (2) plane of the projector filter 68 must occlude the projector beam. This will result in the colour (2) image component being projected first and the colour (1) image component being barred from the screen 64.

To achieve this, the rotating filters 66 and 68 (or 'filter-gate') must be out of phase with each other on each projector, by the precise degree of one colour phase, and they must maintain this throughout.

It is important to understand that the colour (1) image on the primary negative and the inverse colour (2) image on the secondary negative, occupy precisely the same position within the frame on the two negatives and when projected by the two projectors 60 and 62 simultaneously, occupy precisely the same position at precisely the same time on the screen 64.

As a consequence of this, the image on the screen 64 during the first 1/48th of a second, are composed of colour (2) recombined with colour (2). During the second 1/48th of a second they are composed of colour (2) recombined with colour (1) (as seen from the standpoint of the primary projector 60).

The effect of this arrangement is illustrated by FIG. 7. For each frame, the image displayed on the screen, recreated by the two projectors 60 and 62 during the first 1/48 second of the dual projection, will be the positional image created by the original encoding cameras; during the period of their filters first colour occlusion, but with the colour imbalance introduced between the recording cameras through the presence of the filters, now compensated for.

In each of the original encoding cameras 40 and 42, the resulting 48 Hz image, would most likely have been in colour imbalance (on the negative) as compared to its object before the lens (unless, of course, the object was composed solely of colour (1) or colour (2). As a result, the primary projector 60, will project onto the screen 64 the same colour encoded (filmed) by the primary camera 40 (through its filter 50) but also at the exact same time, the secondary projector 62 will project the exact same positional image pattern onto the screen 64, but with the inverse colour so that on the screen 64 the colours recombine to produce the correct original colour display for the audience.

This occurs because each one out of the host of mixed colours generated out of the seven discrete wavelengths of the visible spectrum, is composed of a summation (recombination) on the viewing retina in a characteristic ratio of those discrete wavelengths. Each pure colour in this system creates a null exposure condition (i.e. black), in its inverse set (: the opposing projector or camera).

It is clear that each frame in each projector 60 and 62 contains two images, corresponding to the two which were filmed by the original camera 40 or 42, over a cycle of its revolving filter 50 or 52. The effect of this, will be to produce 48 correct colour images every second, running off two projectors 60 and 62 working at 24 frames a second.

As a further illustration we may consider an object which is red in colour. If we consider camera 40 during the colour (i) occlusion of the encoding camera 40, the object colour red will pass through the filter 50 unaltered producing a 'red image exposure' on the negative. As the colour (2) plane revolves into position it will cut off red light waves, cutting out the image of the red object. As a result on the negative the red object image will correspond to the image produced by a 1/48th sec exposure; the first half of the frame duration.

In camera 52 the filter colour (2) plane will have been in position during the first 1/48th sec, blocking out the red object, but as the colour (1) plane revolved into position a red image exposure will be transmitted onto the film negative.

As a consequence both cameras 50 and 52 have the red object exposed on their film, each for 1/48th of a sec, but in sequential positions, commensurate with the observed flow of action. Therefore when projected by the two projectors, the red object will not be represented as a 1/24th sec blur throughout the frame duration, but will occupy two separate positions each lasting for 1/48th of a second during the duration of a frame.

In the above example the object colour was transmitted by the colour (1) plane of the filter but colour (2) plane was opaque to it. In the majority of cases, however, the objects will have colours that are made up of colour components at wavelengths transmitted by both colour planes of the filters. The principle will hold for all colours.

The system principle is based upon set theory, whereby the colour (2) wavelengths are the inverse set of colour (1) wavelengths and whereby the full spectrum is the complete set. Consequently each projector projects the inverse colour image to the other, during the first 1/48th of a sec. of the frame period and the inverse colour image to itself during the second 1/48th of a sec. of the frame period.

In an alternative embodiment, the projector system of FIGS. 6A to D and 7 may be replaced with a single projector capable of projecting simultaneously two reels of film. Such a projector is shown schematically in FIG. 8.

In the projector assembly of FIG. 8, the elements of each projector sub-assembly remain the same as those of the projectors of FIGS. 6 and 7 so that some components may be common to the two sub-assemblies. In particular, a single larger motor may be used to operate both projectors sub-assemblies in place of two smaller motors. However, there is one exception to the components which may be common to the two sub-assemblies; coloured filter planes are inserted into the rotating shutters used on each projector sub-assembly as shown in FIG. 9.

In this format, the projection system works in precisely the same way as that described above; "inverse" colours generated by the use of filters at the cameras are re-combined. The only difference is in the internal placement of the colour filters behind the lense within the rotating shutter.

Furthermore, servo-synchronised cine projectors may be deployed in a single projector format.

The use of a single projector allows for economy in materials and a reduction in the complexity of the mechanism required and, in particular, in the conversion of existing equipment.

In a preferred form, utilising a single projector, four 35 mm frames produced using the colour filter separation described above are printed in the area commonly used for a single frame on 70 mm film. In this format, shown in FIG. 10, the colours displaced or separated frames are no longer separated by the distance between the two projectors (as shown in FIGS. 6 and 7) but are instead adjacent, printed side-by-side within the 70 mm frame area. As with the dual projector scheme described above, the time shifted frames of half the normal frame period are superimposed, colour displaced, into the space normally allocated to a single 70 mm frame. This is illustrated in greater detail in FIG. 11.

In this manner, a single projector can generate high definition higher resolution cinematographic images. Using this scheme, a single projector can produce screen displace sizes as set out in the table below:

| Print Size | Frame Format | Frame Size | Cromascan Frames Per Print Frame | Screen Display Size |
| --- | --- | --- | --- | --- |
| 70 mm Print | 70 mm (Anamorphic) | 35 mm | 4 | 70 mm |
| 70 mm | 35 mm | 35 mm | 4 | 35 mm |
| 35 mm | 35 mm (Anamorphic) | 35 mm | 4 | 35 mm |
| 35 mm | 16 mm | 16 mm | 4 | 16 mm |

70 mm high definition screen displays can be generated from a single projector provided that anamorphic lenses are employed. Likewise 35 mm screen display sizes can be generated using a 35 mm projector.

Whilst standard projectors can be used, a number of basic modifications are required as follows:

(i) The film projected, must, of course, itself have been produced using colour filter separations described above.

(ii) The required rotating shutter and filter must be fitted to the projector.

(iii) A suitable lense must be provided to ensure that the images displayed coincide on the screen.

FIG. 12 shows an alternative rotating filter shutter which exposes a specific sequence of wavelengths through the film gate so that each of the four 1/48th second exposures recorded on the film frame is produced in the correct order, two at a time, during each half of the frame period. As FIG. 13 shows, the beam forward of the rotating filter is in two halves, each of different colours. The colours are reversed once during each rotation of the filter, that is, once during each normal frame period.

During the 1960's and 1970's many attempts were made to produce three dimensional cinema. These employed a lens capable of receiving two horizontally adjacent images on a film frame and focusing them onto the same area of the cinema screen as shown in FIG. 14. Such a lens permits, likewise, the alignment of two adjacent images formed on a single film strip to produce a single high definition image.

The system described will produce a heightened sense of reality through its effective higher frame rate. More detail will be resolved: fast high-speed motion will be only half as blurred as with a conventional film system.

Where high definition cinema has already been achieved (in other patented systems) the image quality is a marked improvement, however, the apparatus required to both record, process, store and then display the images has been of considerable complexity and of considerable expense.

The system described above achieves high definition by a different approach, and although each frame must now be shared by two images, they have no overall intensity gain or intensity loss. By using two projectors with the principle of inverse colour between them, each image from each projector, although having half the intensity, through being projected through a filter which removes half of the available wavelengths, is being projected twice, once from each projector, which brings the intensity level up to the conventional luminance.

The principle would also be applied using three filter colour planes requiring three projectors and producing a frequency of 72Hz. However, the post-production phase would be more complex. This modification could be continued for each of the seven wavelengths of the visible spectrum, however the demans on the nature of the film and the post-production process could be considerable.

The encoding filter in the original camera, may be replaced with an in-the-camera mechanism, to aid efficiency and economy.

The calibration of the filter shades may be done by filming white light through the original filter.

The two prints repaired for the system described result in a doubling of the audio bandwidth, giving twice the capacity.

Thus, the invention can provide essentially low cost, high-definition cine-photography.

The system could furthermore be adapted for television. It might also be combined with other special cinematographic systems, for example, the 3-D system described in British patent application No. 8909874.3. This would involve the substantial modification of the existing camera design, with the optical plates of the photoscanning tubes of a TV camera, replacing the exposed negative in our two camera system described above. An internal split-beam apparatus would be required, effectively feeding two optical encoding devices, the signal output from such a modified camera, with its doubling up of optical plates and scanning tubes, would be potentially twice the bandwidth; data compression could reduce this, as would a field-shift signal format.

Synchronized filtering would be achieved electronically, with the gain across the tubes/colours being excluded, being reduced or inverted (switched off). The display medium (Cathode Ray Tube) would also require modifications; these would be:

1. a tube with two cathode guns, each operating at the conventional frequency and each precision focused onto the phosphor screen; or
2. a tube with a single cathode gun operating at twice the conventional frequency, with the image retention of the retina, producing the chromatic wavelength re-intergration below the conscious threshold.

I claim:

1. A camera assembly comprising:
   first and second cameras for recording image frames on an image-recording medium, successive frames being displayed, in use, at a predetermined frame rate defining a predetermined frame period;
   each of the first and second cameras being provided with filter means having a plurality of filter planes each capable of transmitting light in a different wavelength band, the filter planes of said filter means being interposed sequentially between an object, the image of which is to be recorded, and the image recording medium so that a complete sequence of filter planes is repeated once in each frame period;
   the filter means of said first camera being such that, at any given time, light transmitted by the filter plane of that said filter means is in an inverse wavelength band to light being transmitted by the filter plane of the filter means of said second camera.

2. A method of recording image frames on an image-recording medium, successive frames being displayed, in use, at a predetermined frame rate defining a predetermined frame period, the method comprising:
   recording image frames simultaneously on two image-recording media; and
   interposing between each of the two image-recording media and an object whose image is to be recorded a respective filter means;
   each filter means having a plurality of filter planes each capable of transmitting light in a different wavelength band, the filter planes of each filter means being interposed sequentially between said object and a respective one of said image-recording media so that a complete sequence of filter planes is repeated once in each frame period;
   the filter means associated with the two image-recording media being such that, at any given time, light transmitted by the filter plane of one of said filter means is in an inverse wavelength band to light being transmitted by the filter plane of the other of said filter means.

3. Means for displaying image frames recorded on a recording medium, the image frames being displayed, in use, so that successive image frames are displayed at a predetermined frame rate defining a predetermined frame period, each image frame comprising a plurality of image components superimposed on one another, the plurality of image components having been formed by successive exposures to light in different wavelength bands during a single frame period; said means for displaying comprising:
   means for displaying two sets of image frames simultaneously on a single display means;
   means for deriving a light signal from said recorded image frames;
   first and second filter means associated respectively with said two sets of image frames, each of said filter means having filter elements each capable of transmitting a light signal representing a different wavelength band, the light signal from each of said sets of image frames being passed through the filter elements of the filter means associated with said set of image frames sequentially so that a complete sequence of filter elements is repeated once in each frame period;
   said first and second filter means being such that, at any given time, the wavelength band transmitted by the filter element acting on the light signal derived from one of said sets of image frames is the inverse of that acting on the light signal derived from the other said set.

4. The invention set forth in claim 3 comprising means for projecting cinematographic film being said recording medium on which image frames are recorded.

5. The invention set forth in claim 4 in which the first and second filter means are formed by a single rotary filter having the filter elements thereof disposed in a plurality of sectors arranged around the circumference of said rotary filter, said rotary filter rotating, in use, at a rate which is a multiple of said predetermined frame rate, at any given time, the light signals from said two sets of image frames passing through different filter elements of said rotary filter.

6. Means according to claim 3, in which the wavelength bands transmitted by the filter elements, when combined, cover the whole visible spectrum of light.

7. A method of displaying image frames recorded on an image-recording medium, wherein successive frames are displayed, in use, at a predetermined frame rate defining a predetermined frame period, each image frame comprising a plurality of image components superimposed on one another, the plurality of image components having been formed by successive exposures to light in different wavelength bands during a single frame period; the method comprising:
   displaying two such sets of recorded image frames simultaneously on a single display means;
   deriving a light signal from said respective sets of recorded image frames;
   passing the light signals derived from said sets of image frames through first and second filter means respectively, each of said filter means having filter elements each capable of transmitting a light signal representing a different wavelength band, the light signal from each of said sets of image frames being passed through the filter elements of the filter means associated with that said set of image frames sequentially so that a complete sequence of filter elements is repeated once in each frame period;

said first and second filter means being such that, at any given time, the wavelength band transmitted by the filter element acting on the light signal derived from one of said sets of image frames is the inverse of that acting on the light signal derived from the other said set.

8. A method according to claim 7 which is a method of displaying image frames recorded on cinematographic film.

9. A method according to claim 7, in which the wavelength bands transmitted by the filter elements, when combined, cover the whole visible spectrum of light.

* * * * *